United States Patent
Flinck et al.

(10) Patent No.: US 7,099,326 B2
(45) Date of Patent: Aug. 29, 2006

(54) SYSTEM AND METHOD FOR FAST GPRS FOR IPV6 COMMUNICATIONS

(75) Inventors: Hannu Flinck, San Jose, CA (US); Charles E. Perkins, Saratoga, CA (US); Hossam Afifi, Paris (FR)

(73) Assignee: Nokia Inc., Irving, TX (US)

( * ) Notice: Subject to any disclaimer, the term of this patent is extended or adjusted under 35 U.S.C. 154(b) by 964 days.

(21) Appl. No.: 10/084,003

(22) Filed: Feb. 25, 2002

(65) Prior Publication Data

US 2002/0150085 A1 Oct. 17, 2002

Related U.S. Application Data

(60) Provisional application No. 60/271,190, filed on Feb. 23, 2001.

(51) Int. Cl.
*H04L 12/56* (2006.01)
(52) U.S. Cl. ............... 370/392; 370/465; 370/469; 370/328
(58) Field of Classification Search ........ 370/401, 370/465, 466, 469, 392, 328
See application file for complete search history.

(56) References Cited

U.S. PATENT DOCUMENTS

| | | | |
|---|---|---|---|
| 6,195,705 B1 | 2/2001 | Leung | 709/245 |
| 6,671,287 B1 * | 12/2003 | Huttunen et al. | 370/469 |
| 6,769,000 B1 * | 7/2004 | Akhtar et al. | 707/103 R |
| 6,839,339 B1 * | 1/2005 | Chuah | 370/349 |
| 6,847,610 B1 * | 1/2005 | Suumaki et al. | 370/230.1 |
| 6,948,108 B1 * | 9/2005 | Ludwig et al. | 714/748 |
| 6,959,009 B1 * | 10/2005 | Asokan et al. | 370/475 |
| 2002/0039367 A1 | 4/2002 | Seppala et al. | 370/401 |

* cited by examiner

*Primary Examiner*—Min Jung
(74) *Attorney, Agent, or Firm*—Darby & Darby PC; M. David Ream

(57) ABSTRACT

A system and method for fast GPRS for IPv6 may improve data transfer efficiency in mobile networks, for example, in networks that relay on the GPRS infrastructure as defined and standardized in the European Telecommunications Standards Institute (ETSI), and on mobile IPv6 as standardized in the IETF. Mobile IPv6 techniques may be applied in the context of GPRS to transform mobility management into a routing problem, for example, by translating the routing area identifier into a part of the routing prefix in IPv6. Similar mobile IPv6 techniques also may provide an evolution path toward internetworking using native mobile IPv6.

20 Claims, 9 Drawing Sheets

| | 1 | 2 | 3 | 4 | 5 | 6 | 7 | 8 | |
|---|---|---|---|---|---|---|---|---|---|
| Routing Area Identification IEI | | | | | | | | | octet 1 |
| MCC digit 2 | | | | MCC digit 1 | | | | | octet 2 |
| MNC digit 3 | | | | MCC digit 3 | | | | | octet 3 |
| MNC digit 2 | | | | MNC digit 1 | | | | | octet 4 |
| LAC | | | | | | | | | octet 5 |
| LAC cont.ed | | | | | | | | | octet 6 |
| RAC | | | | | | | | | octet 7 |

FIG. 7

| IEI | Information Element | Type/Reference in 24.008/3.5 | Length in bytes |
|---|---|---|---|
| | Protocol discriminator | Protocol discriminator 10.2 | 1/2 |
| | Skip indicator | Skip indicator 10.3.1 | 1/2 |
| | Routing area update request message identity | Message type 10.4 | 1 |
| | Update type | Update type 10.5.5.18 | 1/2 |
| | GPRS ciphering key sequence number | Ciphering key sequence number 10.5.1.2 | 1/2 |
| | Old routing area identification | Routing area identification 10.5.5.15 | 6 |
| | MS Radio Access capability (FAST) | MS Radio Access capability 10.5.5.12a | 6 - 52 |
| 19 | Old P-TMSI signature (FAST) | P-TMSI signature 10.5.5.8 | 4 |
| 17 | Requested READY timer value | GPRS Timer 10.5.7.3 | 2 |
| 27 | DRX parameter | DRX parameter 10.5.5.6 | 3 |
| 9- | TMSI status | TMSI status 10.5.5.4 | 1 |
| 18 | P-TMSI | Mobile Identity 10.5.1.4 | 7 |
| 31 | MS network capability (FAST) | MS network capability 10.5.5.12 | |

# SYSTEM AND METHOD FOR FAST GPRS FOR IPV6 COMMUNICATIONS

RELATED APPLICATION

This utility patent application is a continuation of a previously filed U.S. provisional patent application, U.S. Ser. No. 60/271,190 filed on Feb. 23, 2001, the benefit of the filing date of which is hereby claimed under 35 U.S.C. §119(e).

FIELD OF THE INVENTION

This invention relates generally to data transfer efficiency and more specifically, to data transfer efficiency in GPRS cellular networks.

BACKGROUND OF THE INVENTION

General Packet Radio Service (GPRS) systems such as Global System for Mobile Communications (GSM) and Universal Mobile Telecommunications System (UMTS) currently rely on two network elements: a serving GPRS support node (SGSN) and a gateway GPRS support node (GGSN). A tunneling protocol called the GPRS tunneling protocol (GTP) typically handles the correspondent flows between the SGSN and the GGSN. One GGSN typically routes traffic between a mobile node on the GPRS system and the correspondent flows on the GTP tunnel. Routing the mobile node traffic and the correspondent flows through one GGSN causes inefficiency in the routing of data within the GPRS system.

Currently available methods for streamlining routing include the application of mobile Internet Protocol Version 6 (IPv6) mechanisms. However, there is currently no means for GPRS systems to exploit the packet transfer acceleration opportunities provided by mobile IPv6. A desirable goal would be to increase the efficiency and cost effectiveness of the GPRS solution to mobility management.

SUMMARY OF THE INVENTION

A system and method for fast GPRS for IPv6 is disclosed in which data transfer efficiency is improved in cellular networks. In an embodiment of the present invention, the cellular network relies on the GPRS infrastructure as defined and standardized in the European Telecommunications Standards Institute (ETSI), and on mobile IPv6 as currently being standardized in the Internet Engineering Task Force (IETF). Mobile IPv6 techniques may be applied in the context of GPRS to transform mobility management into a routing problem. For example, in an embodiment of the present invention, the routing area identifier is translated into a part of the routing prefix in IPv6. Similar mobile IPv6 techniques also may provide an evolution path toward internetworking using native mobile IPv6.

BRIEF DESCRIPTION OF THE DRAWINGS

FIG. 7 is a diagram illustrating contents of an exemplary routing area identification information element in a system and method for fast GPRS;

FIG. 8 is a diagram illustrating a table showing exemplary routing area update request message content in a system and method for fast GPRS, in accordance with the present invention.

DETAILED DESCRIPTION OF THE PREFERRED EMBODIMENT

Figure 1:
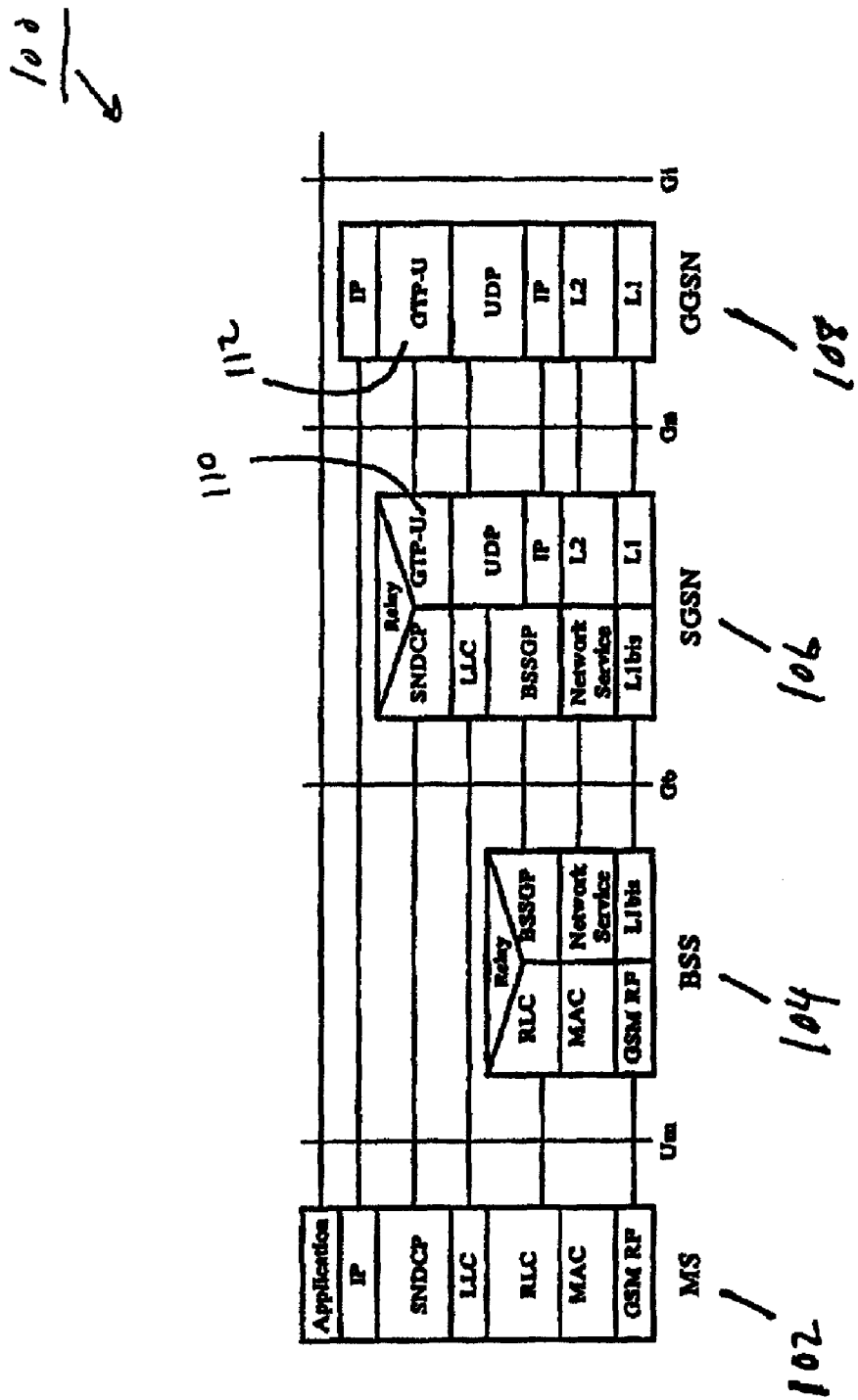
FIG. 1 is a diagram illustrating a GPRS system for GSM.

A system and method for Fast GPRS for IPv6 in accordance with an embodiment of the present invention is disclosed herein. In the following description, numerous specific details are set forth to provide a thorough understanding of the present invention. However, it will be evident to those skilled in the art that these specific details need not be used to practice the present invention and alternative embodiments are possible. In other cases, well-known structures and circuitry have not been shown in detail to avoid unnecessarily obscuring the present invention.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" include plural references. The meaning of "in" includes "in" and "on." The term "operator" refers to any technician or organization that maintains or services an IP packet based network. Referring to the drawings, like numbers indicate like parts throughout the views. Additionally, a reference to the singular includes a reference to the plural unless otherwise stated or is inconsistent with the disclosure herein.

The invention provides for accelerating packet transfer in GPRS systems with the use of a specific mobility management technique in mobile nodes. The invention has minimal impact on the GPRS node development. A minor modification to the GPRS core network (UTMS Radio Access Network "UTRAN" in UMTS and SGSN in GSM) is also necessary. The resulting system is more efficient and cost effective than the actual GPRS solution. The basic idea is that the routing area identifier is to be translated into a part of the routing prefix in IPv6. The result is a combined GPRS and IPv6 routing infrastructure. This enables IPv6 mobility to be used as an alternative to GPRS mobility.

Figure 3:
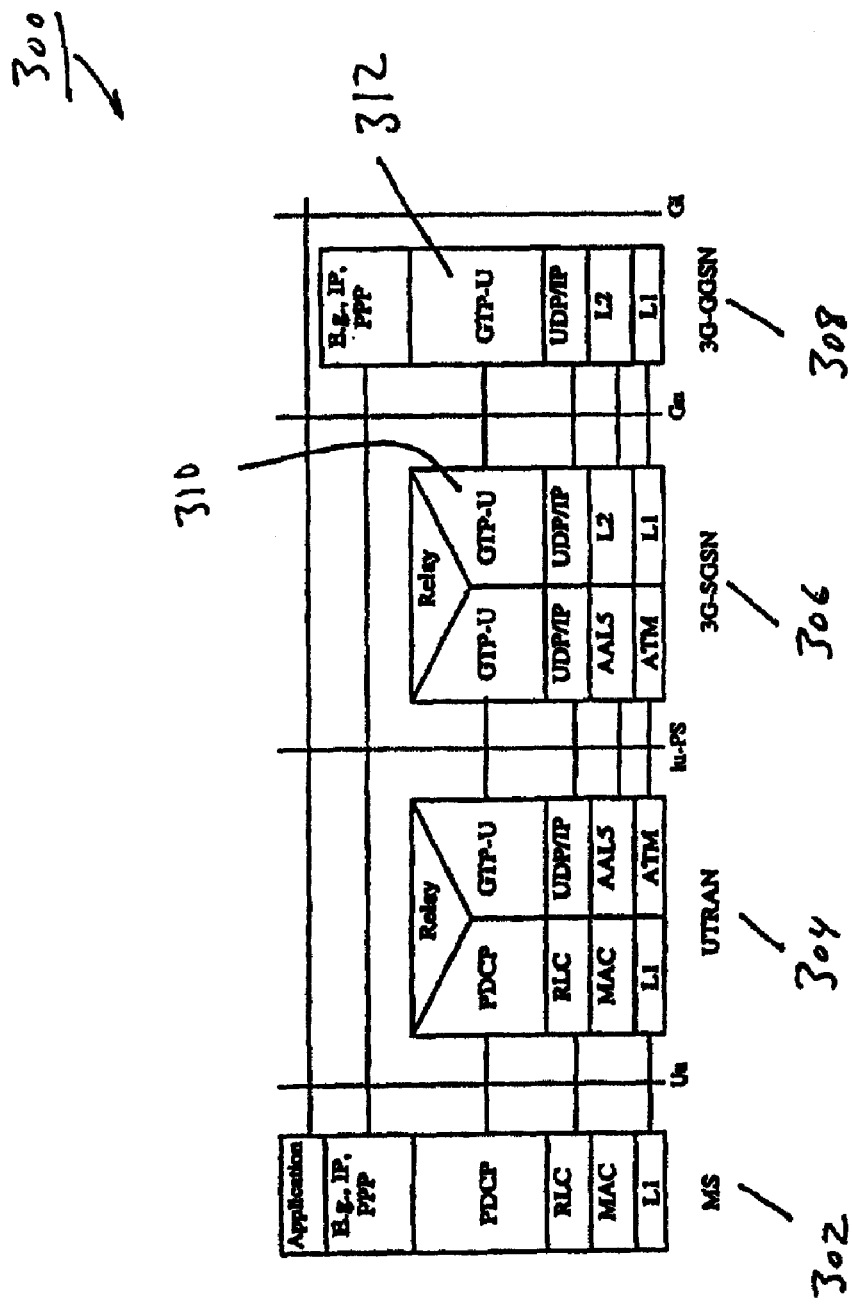
FIG. 3 is a diagram illustrating a GPRS system for UMTS.

Currently, GPRS (GSM/UMTS) systems such as those shown in FIG. 1 and FIG. 3 respectively, do not exploit the opportunities given by mobile IM, that transforms mobility management into a routing problem. In FIG. 1, the GSM system 100 includes MS (mobile node) 102, BSS (Base Station Subsystem) 104, SGSN 106, and GGSN 108. In FIG. 3, a UMTS system 300 includes MS (mobile node) 302, UTRAN 304, 3G-SGSN 306, and 3G-GGSN 308.

The current GPRS system relies on two network elements, SGSN 106, 306, and GGSN 108, 308, and the tunneling protocol called GTP between them (shown as GTP-U 110, 112, 310, 312). The traffic between the mobile node and the correspondent flows through a tunnel that is typically anchored into one GGSN 108, 308. This causes inefficiency in the routing of data within the GPRS system. By applying mobile IPv6 more straightforward mechanisms a more streamlined routing could be achieved and also an evolution path towards interworking with native mobile IPv6 based networking could be accomplished.

The invention bypasses the usage of the GTP (in GSM) and GTP-U (in UMTS) protocol for data routing in GPRS. GTP is not specifically tailored for IP level mobility handing and is hence not optimal for native mobile IPv6 (or mobile IPv4). The technique that we propose is a "cut-through" in the GPRS network to extract IPv6 traffic out to the conventional Internet network before it enters into GTP. The proposed solution can co-exist with the GPRS network and relies on GPRS signaling, but handles traffic from mobile IPv6 capable nodes differently. For more information on GTP, see 3GPP TS 29.060 V3.6.0 (2000-09) Technical Specification Group Core Network; General Packet Radio Service (GPRS); GPRS Tunneling protocol (GTP) across the Gn and Gp Interface (Release 1999), which is herein incorporated by reference.

Figure 2:
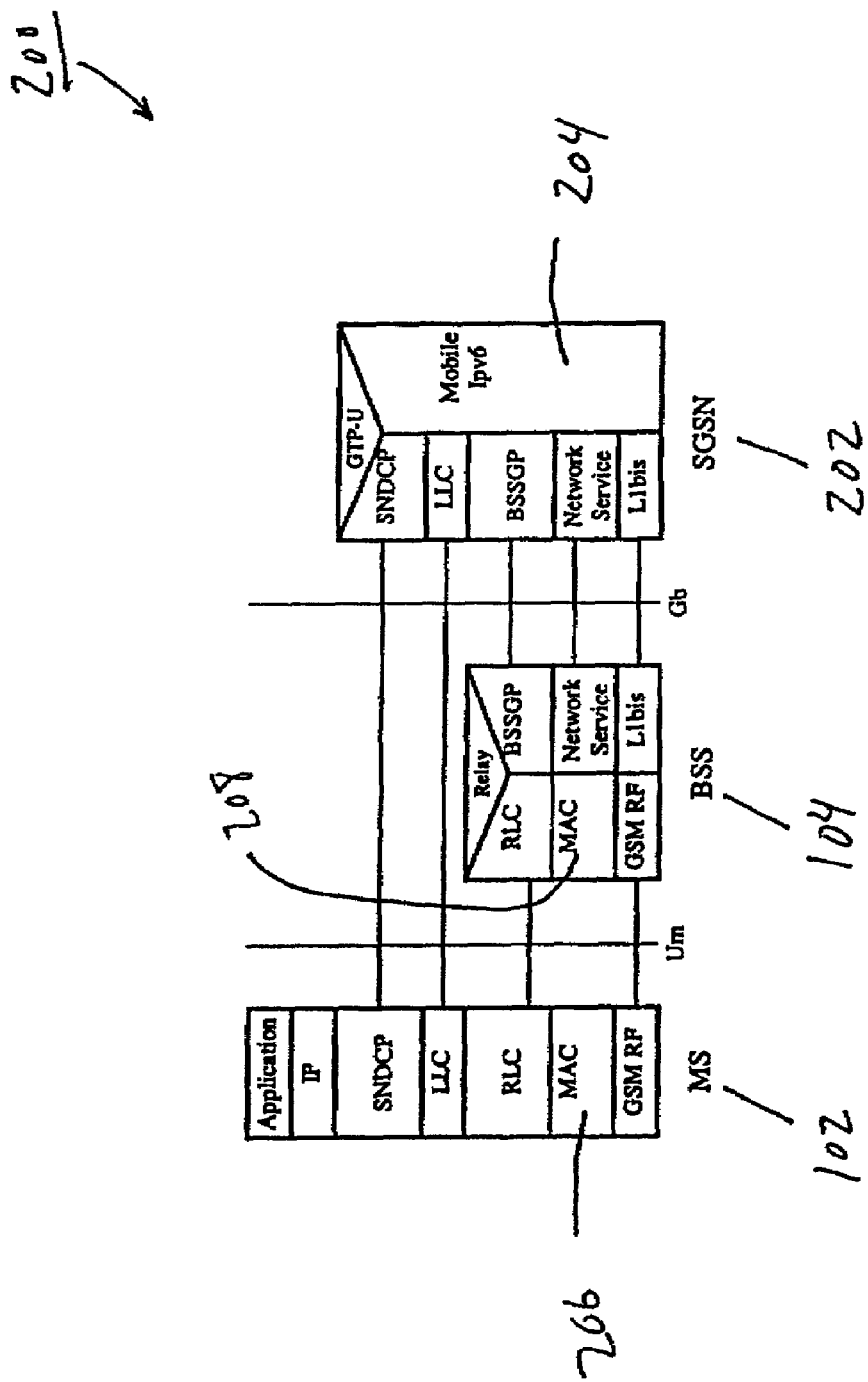
FIG. 2 is a diagram illustrating a system for fast GPRS for GSM.
Figure 4:
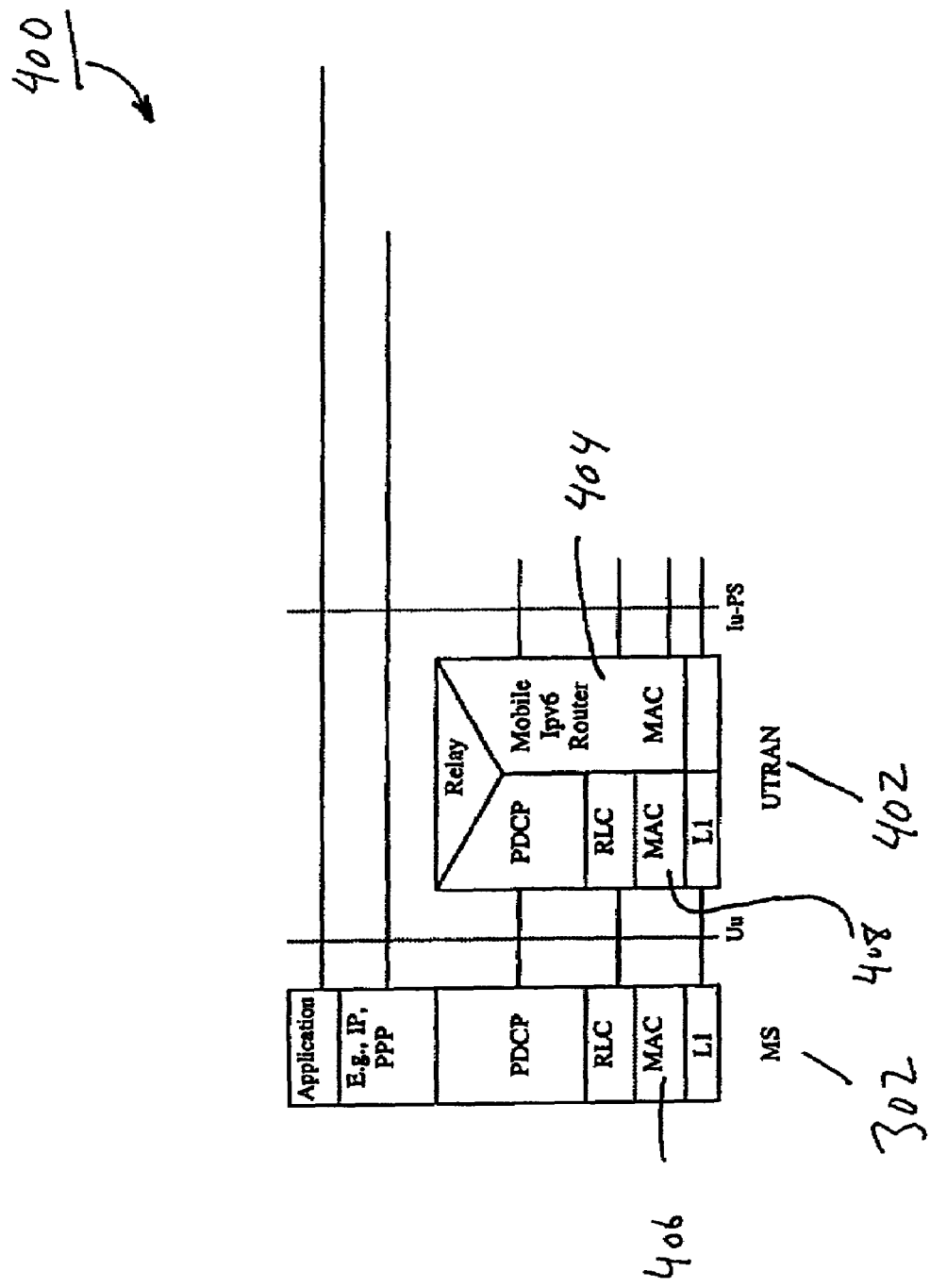
FIG. 4 is a diagram illustrating a system for fast GPRS for UMTS.

Example embodiments of systems for Fast GPRS for IPv6 in accordance with the present invention are shown in the block diagrams 200 and 400 of FIG. 2 and FIG. 4 respectively. In an embodiment of the present invention, an improvement is made to Mobile IPv6 by rapidly notifying the IPv6 layer of mobility within the cellular network, which improves GPRS routing and throughput by using Mobile IPv6 instead of GTP. (See 204 in the GSM type GPRS system 200 of FIG. 2 and see 404 in the UMTS-type GPRS system 400 of FIG. 4.) An additional advantage of FAST GPRS is that it co-exists with the GPRS and it is hence possible to use at some times the FAST GPRS and in others come back to the conventional solution. Interworking between GPRS networks and native mobile IPv6 networks would be easier. For more information on combining GSM and Mobile IP Mobility Handling, see 3GPP Technical Specification Group Services and System Aspects; Combined GSM and Mobile IP Mobility Handling in UMTS IP (3G TR 23.923 version 3.0.0), which is herein incorporated by reference. In particular, 3G TR 23.923 version 3.0.0 discloses that Binding Update messages can include a mobile terminal's new care-of address (see, e.g., numbered page 70) and that a mobile terminal can generate and send a Binding Update message (see, e.g., FIG. A.5 on numbered page 71).

FIG. 4 is a diagram illustrating a system for fast GPRS for UMTS in accordance with an embodiment of the present invention. The Media Access Control (MAC) layer 206, 208, 404, 406, 408 in Fast GPRS nodes has the role of routing area advertisement translation from the GPRS system 200, 400 to the Mobile IPv6 router advertisements messages (ICMPv6). When the MS (mobile node) 302 receives a Routing area change notification from the SGSN 202 or UTRAN 402, its MAC layer adaptation creates locally an IPv6 router advertisement message 500 to the IPv6 layer. The MAC layer adapter 404 uses Routing Area Identifier to create the needed prefix information element 600 for the IPv6 Router Advertisement message 500. When the IPv6 layer of the mobile node receives this message it configures a new care of address based on the prefix 602 that was created by the MAC layer adapter. The IPv6 layer responds normally according to Mobile IPv6 specifications by sending a Binding Update. The MAC layer in the node encapsulates the binding update into the GPRS routing area request. For more information, see 3GPP TS 23.060 V3.5.0 (2000-10) Technical Specification Group Services and System Aspects; General Packet Radio Service (GPRS). Service Description (Release 1999), which is herein incorporated by reference.

For this there are at least two alternative embodiments. Either a new Information Element Identifier is introduced for Routing Area Update message that carries all mobile IPv6 signaling or a new Update type is introduced. In the latter case, this new Routing Area Update Request type should be set to a unique globally recognized (i.e. to be standardized and reserved for this purpose) value. For example, the value '11', may be used in order to indicate that it is not a normal routing area update request, but that it needs specific processing for the mobile IPv6 context. This is described in more detail below. If the GPRS system does not recognize or support the request for a mobile IPv6 context set up, then the GPRS system rejects the special routing area update request and the mobile node falls back to the normal Packet Data Protocol (PDP) address activation process requesting IPv6 context from the normal GPRS.

In case the network recognizes the Fast GPRS routing area update request containing the Mobile IPv6 Binding Update, it is sent by the Access router (Radio Network Controller "RNC" in UMTS or SGSN in GSM) to its Home agent as part of standard mobile IP operation. All IP traffic that uses this mobile IPv6 PDP is extracted in SGSN (or alternatively in RNC) and routed directly into Internet. Note that the Mobile node should send (in case FAST GPRS routing area update request is accepted by the network) a second routing area update request with the type set to periodic or new routing area update to update the normal GPRS lower layers.

Figure 9:
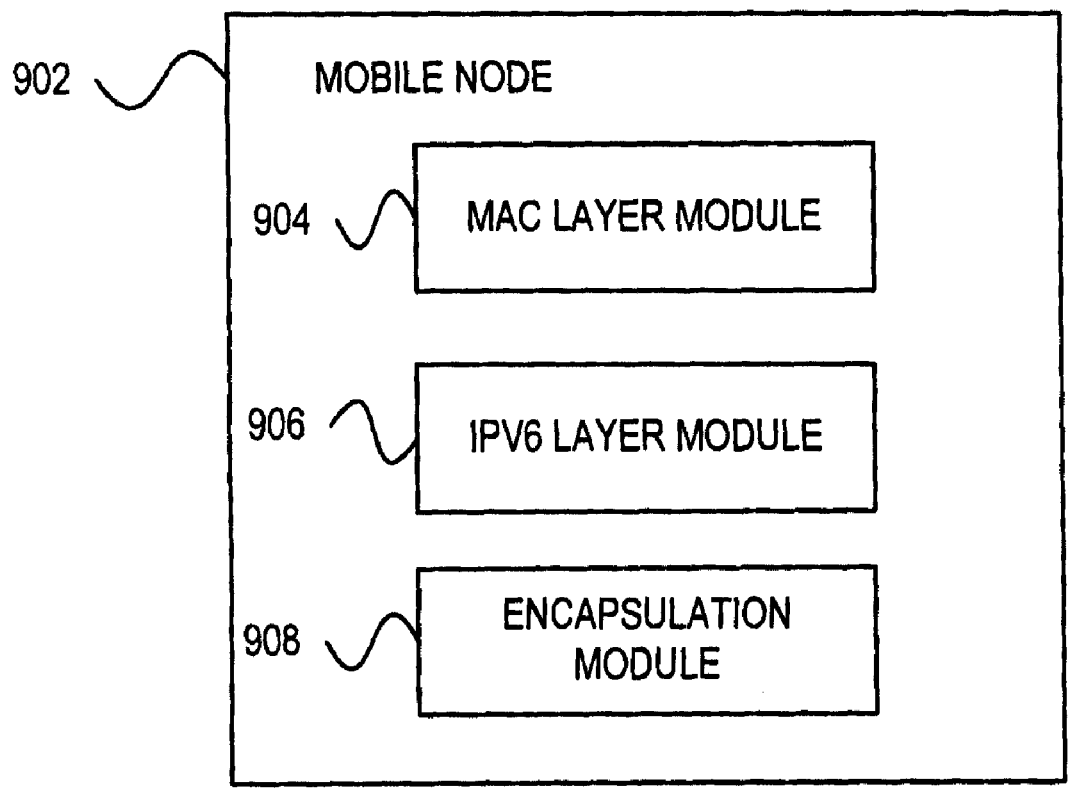
FIG. 9 is a diagram illustrating an exemplary mobile node.

FIG. 9 illustrates an exemplary mobile node 902, that includes a MAC layer module 904, an IPv6 layer module 906, and an encapsulation module 908, arranged to perform the respective functions described herein. The mobile nodes 102, 302 can be implemented using the mobile node 902 and/or the structure shown in FIG. 9.

FIG. 8 is a table 800 showing examples of the message content of a Routing Area Update Request in a system and method for Fast GPRS in accordance with an embodiment of the present invention.

For authentication reasons, it is necessary to delay Mobile IPv6 Binding updates sent to the home agent until the GPRS authentication is verified. The sending of Binding Update Acknowledgement (BACK) should be delayed until Routing Area Update Accept message from a SGSN or RNC is sent. The BACK message is carried in the Routing Area Update Accept message.

The invention necessitates a MAC layer adapter in the Mobile node supporting IPv6 on top of GPRS. The role of this MAC layer adapter is to generate Internet Control Message Protocol (ICMP) v6 Router advertisement messages from GPRS Routing area update messages. The Prefix advertised by this router advertisement is taken from the GPRS MM (Mobility Management) layer and is called the Routing Area Identifier (RAI). An example of a Routing Area Identification information element identifier (IEI) 700 is shown in FIG. 7. The adapter converts the RAI into advertised network prefixes in the corresponding ICMPv6 Router Advertisement messages.

At the SGSN/RNC there is a substantially similar adapter layer that extracts Binding Update messages from the Routing area updates received by the mobile node. It creates standard Binding Update messages for the Home Agents. Here the Authentication Header is calculated based on the GPRS key distribution mechanism.

A second modification may be done in the UTRAN network side for UMTS and in the SGSN for GSM networks for the purpose of extracting IP traffic from the mobile IPv6 node. This can be done based on the specific PDP context that was activated, or alternatively, an SGSN/RNC could check the IPv6 source address of the packets received from the mobile node. If the source address contains a prefix under the responsibility of the SGSN or UTRAN, then the packet is simply routed out of the GPRS network into the Internal infrastructure. A mapping entry between the IPv6 address and mobile node is stored in the SGSN/UTRAN. Similarly, when packets arrive at the SGSN or UTRAN, the IPv6 layer fetches the adequate mobile node context and if it exists, forwards the IPv6 packet in the conventional SNDCP/PDCP layer format. From the network side (SGSN or RNC in UTRAN), special routing area update requests are received from a mobile node asking for the Fast GPRS service. With the normal GPRS identification procedure (Identification Request message), it is possible to poll the node to determine whether the equipment belongs to a particular party, manufacturer, or if the user has a license agreement with that party. Such identification procedures may be useful for a variety of reasons, including determining whether or not another party has implemented an embodiment of the present invention.

Figure 5:
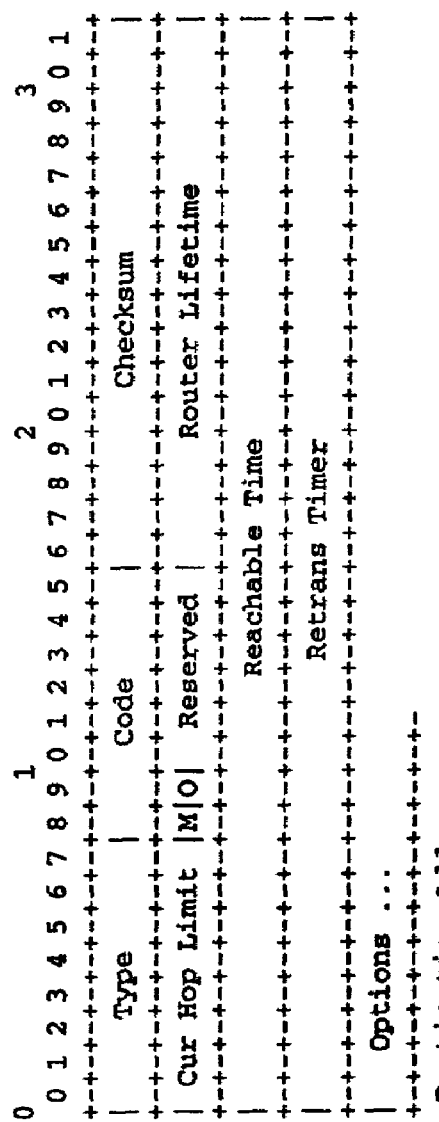
FIG. 5 is a diagram illustrating contents of an exemplary packet format for router advertisements in a system and method for fast GPRS.

FIG. 5 is a diagram illustrating contents of an exemplary packet format 500 for router advertisements in a system and method for fast GPRS in accordance with an embodiment of the present invention. The packet format 500 for router advertisements is defined in RFC 2461. Since the mobile node's MAC layer generates the frame, the link local source address could set to zero or alternatively to a link local address that was derived from Routing Area Identifier. This is to distinguish between other router advertisements arriving from the GGSN or other routers. The Router Lifetime should contain the frequency with which the mobile node receives information about Routing Area Updates. Typically, this depends on the physical layer. No Reachable Time field should be set. The Retrans Timer contains the value that has been assigned for the Ready Timer Function inherent to GPRS Mobility Management.

Figure 6:
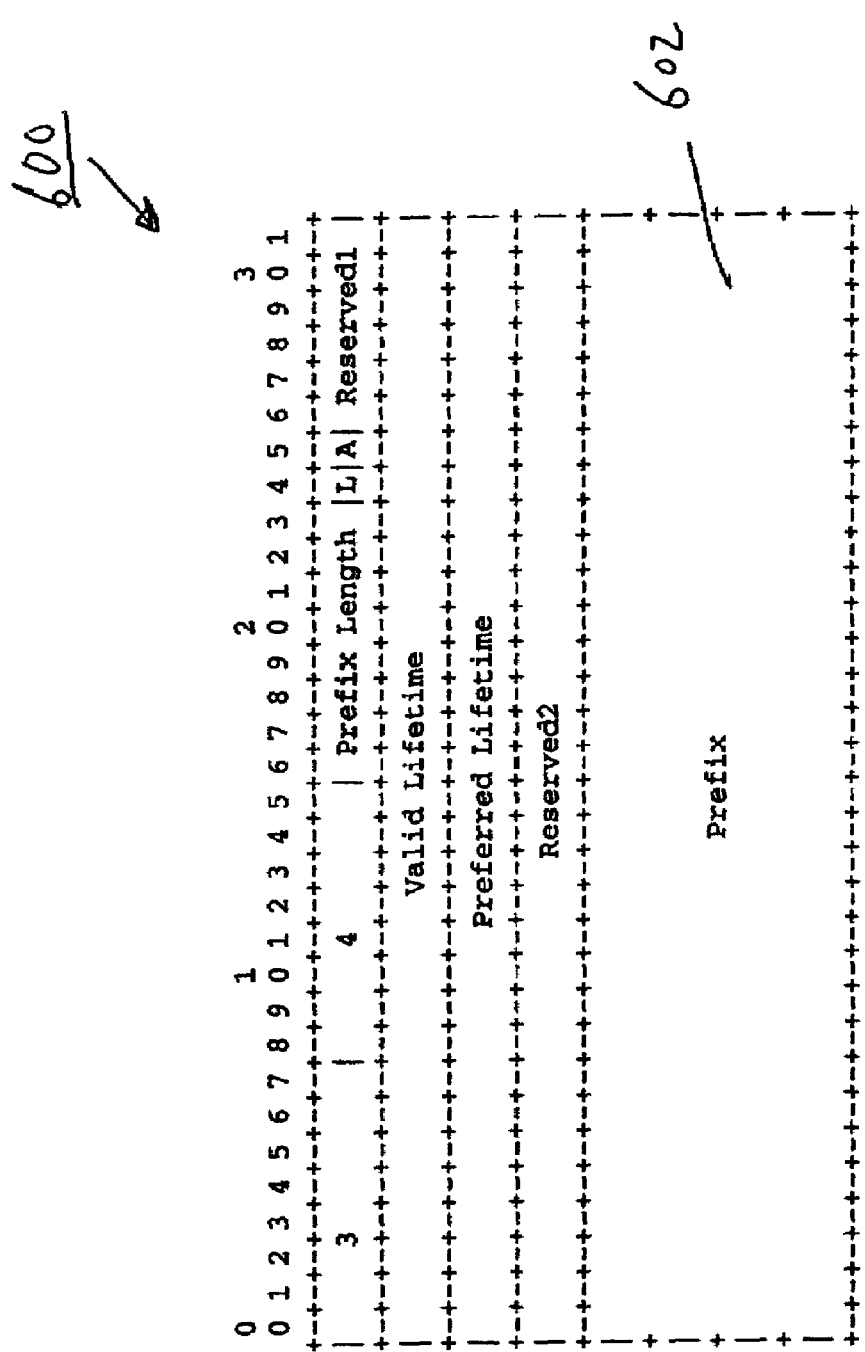
FIG. 6 is a diagram illustrating an example of prefix information coding in a system and method for fast GPRS.

The destination address contains the anycast all-nodes multicast address. The Hop Limit should be set to zero. The Prefix Information contains the Value and length of the prefix as deduced from the Routing Area Update. The Prefix information may be coded as shown in FIG. 6. FIG. 6 is a diagram illustrating an example of prefix information coding in a system and method for fast GPRS in accordance with an embodiment of the present invention.

The L bit has to be set to one. The A bit has to be set to one. Valid Lifetime and Preferred Lifetime should be set to the Requested READY timer value from the GPRS environment.

The prefix value is literally taken from the RAI (Routing Area Identifier) as defined in the ETSI recommendations (23-060, 24008). The octets 2 to 7 are inserted in the Prefix so that the octet one represents the most significant octet and octet 7 the least significant. Choosing prefixes will depend on each operator's routing plan. FIG. 7 is a diagram illustrating contents of an exemplary routing area identification information element in a system and method for fast GPRS in accordance with an embodiment of the present invention. Routing Area Identity (RAI), defined by an operator, identifies one or several cells. In one embodiment that employs GSM, RAI is broadcast as system information. In another embodiment that employs UMTS, RAI is broadcast to mobile nodes in Radio Resource Control (RRC) Idle mode, and is notified to mobile nodes in RRC Connected mode on established RRC connections as MM system information. The acronyms listed in the equations below are as follows: Location Area Identity (LAI), Mobile Country Code (MCC), Mobile Network Code (MNC), Link Access Control (LAC), Radio Admission Control (RAC), Cell Identity (CI), and Cell Global Identification (CGI)

$LAI=MCC+MNC+LAC.$ $RAI=MCC+MNC+LAC+RAC.$ $CGI=LAI+CI$ (GSM only).

When a packet is received in the Sub-network Dependent Convergence Protocol (SNDCP) layer for the SGSN, the source is checked before tunneling through GTP. If the mobile node sending the packet has made a Fast GPRS request, then the packet is taken out from the GPRS network and routed directly into the IPv6 Internet. The SGSN stores the correspondence between the Service Access Point (SAP), Temporary Logical Link Identity (TLLI) and GPRS context with the newly assigned IPv6 address.

When packets arrive from the IPv6 network with a destination prefix equal to that of the SGSN and the SGSN recognizes the Destination Address to be already registered and has an active IPv6 context with Fast GPRS functionality, it forwards the packet through the normal SNDCP encapsulation procedures.

The SGSN performs the authentication procedure, and the RNC performs the ciphering procedure based on the algorithm for UMTS. In one embodiment, the SGSN is third generation, i.e., 3G-SGSN. When the RNC in UTRAN receives a routing area update from a new mobile node, it checks if the Routing Area Update Request type corresponds to the FAST GPRS method. If so, the RNC forwards the Routing Area Update to the SGSN and when the Bearer Access is granted by the SGSN, the RNC applies the same procedure as in the GSM case: It looks for every PDCP packet coming from the node and pulls it out from the GPRS to the Internet. When packets are received for the specific mobile node from outside the network, the RNC determines if a bearer exists for that mobile node. If so, the RNC forwards the packet on top of the PDCP protocol using the appropriate compression as specified in the PDCP protocol.

The MAC procedures have been described above. The Binding Update messages may be sent at the frequency of the Routing Area Update Requests. FIG. 8 is a diagram illustrating a table showing exemplary routing area update request (Fast GPRS) message content in a system and method for fast GPRS in accordance with an embodiment of the present invention. In one embodiment, the Binding Update is inserted in the Routing Area Update Request in the field number 31. In this case, the Update Type information element identifier (IEI) can be set to 11 to prevent confusion with non-Fast GPRS network elements. Alternatively, a new IEI that denotes mobile IPv6 binding update/acknowledgement messages can be allocated. The Routing Area Update Accept Message can be sent upon the reception of a Binding Acknowledgment from the Home Agent in Mobile IPv6 or sent directly to the node. In one embodiment, this choice (selection) is available to the operator.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for fast GPRS in a GPRS network that includes an IPv6 layer and a MAC layer, comprising:
   (a) in response to receiving a GPRS routing area update message at a mobile node, employing an adapter at a MAC layer of the mobile node to generate a router advertisement message, wherein the router advertisement message is communicated to an IPv6 layer on the mobile node;
   (b) generating a care of address at the IPv6 layer on the mobile node based on a router advertisement message; and
   (c) generating a Mobile IPv6 Binding Update at the IPv6 layer on the mobile node, wherein the Mobile IPv6 Binding Update comprises the generated care of address;
   (d) employing the adapter at the MAC layer of the mobile node to encapsulate the Mobile IPv6 Binding Update message into a routing area request, wherein the routing area request is communicated to the GPRS network, and wherein the routing area request includes an information element associated with a predetermined routing type that is employed by the GPRS network for IP level routing with the mobile node.

2. The method of claim 1, wherein the routing area request includes signaling information for mobile IPv6 processing.

3. The method of claim 1, further comprising when the predetermined routing type in the routing area request is recognized by the GPRS network, the Mobile IPv6 Binding Update message contained in the routing area request is forwarded to a Home Agent for the mobile node.

4. The method of claim 3, further comprising delaying the forwarding of the Mobile IPv6 Binding Update message to the Home Agent until authentication by the GPRS network.

5. The method of claim 4, wherein the delaying includes delaying the sending of a Binding Acknowledgement message until a Routing Area Update Accept message is generated by an SGSN on the GPRS network.

6. The method of claim 4, wherein the delaying includes delaying the sending of a Binding Acknowledgement message until a Routing Area Update Accept message is generated by an RNC on the GPRS network.

7. The method of claim 3, further comprising when the Mobile IPv6 Binding Update message is forwarded to the Home Agent, the mobile node provides a second routing area request to the GPRS network.

8. The method of claim 7, wherein the second routing area request includes a predetermined type, including one of periodic and new routing area update.

9. The method of claim 1, further comprising indicating that Mobile IPv6 processing is to be used by the GPRS network for handling the routing area request.

10. The method of claim 1, further comprising when the information element is unrecognized by the GPRS network, employing the PDP address activation process to request IPv6 context set up on the GPRS network.

11. The method of claim 1, wherein information for care of address generation is included in the routing area request.

12. A system for fast GPRS processing in a GPRS network that includes an IPv6 layer and a MAC layer, comprising:
   (a) a MAC layer module on a mobile node that generates a router advertisement message in an IPv6 format in response to receiving a GPRS routing area update message, wherein the router advertisement message is communicated to an IPv6 layer of the mobile node;
   (b) the IPv6 layer module on the mobile node that generates a care of address in response to receiving the router advertisement message from the MAC layer module, and generates a Mobile IPv6 Binding Update comprising the generated care of address; and
   (c) an encapsulation module at the MAC layer of the mobile node that encapsulates a Mobile IPv6 Binding Update message into a routing area request, wherein the routing area request is communicated to the GPRS network, and wherein the routing area request includes an information element associated with a predetermined routing type that is employed by the GPRS network for routing subsequent communication with the mobile node.

13. The system of claim 12, further comprising a mobile IP module that includes signaling information for mobile IPv6 processing in the routing area request.

14. The system of claim 12, further comprising a module that provides a second routing area request to the GPRS network when the Mobile IPv6 Binding Update message is forwarded to a Home Agent.

15. The system of claim 14, further comprising a module that delays the forwarding of the Mobile IPv6 Binding Update message to the Home Agent until authentication by the GPRS network.

16. The system of claim 14, further comprising a module that provides a second routing area request to the GPRS network when the Mobile IPv6 Binding Update message is forwarded to the Home Agent.

17. The system of claim 12, wherein the GPRS network includes at least one of GSM, CDMA, TDMA, W-CDMA, 3G-CDMA or UMTS protocols.

18. The system of claim 12, further comprising a module that determines when Mobile IPv6 processing is indicated for handling the routing area request.

19. The system of claim 12, further comprising a module that includes information for care of address generation in the routing area request.

20. An apparatus for fast GPRS in a GPRS network that includes an IPv6 layer and a MAC layer, comprising:
   (a) means for employing an adapter at a MAC layer of a mobile node to generate a router advertisement message in response to receiving a GPRS routing area update message at a mobile node, wherein the router advertisement message is communicated to an IPv6 layer on the mobile node;
   (b) means for generating a care of address at the IPv6 layer on the mobile node based on a router advertisement message, the means for generating a care of address comprising means for generating a Mobile IPv6 Binding Update wherein the Binding Update comprises the generated care of address; and
   (c) means for employing the adapter at the MAC layer of the mobile node to encapsulate the Mobile IPv6 binding update message into a routing area request, wherein the routing area request is communicated to the GPRS network, and wherein the routing area request includes an information element associated with a predetermined routing type that is employed by the GPRS network for IP level routing with the mobile node.

* * * * *